United States Patent Office.

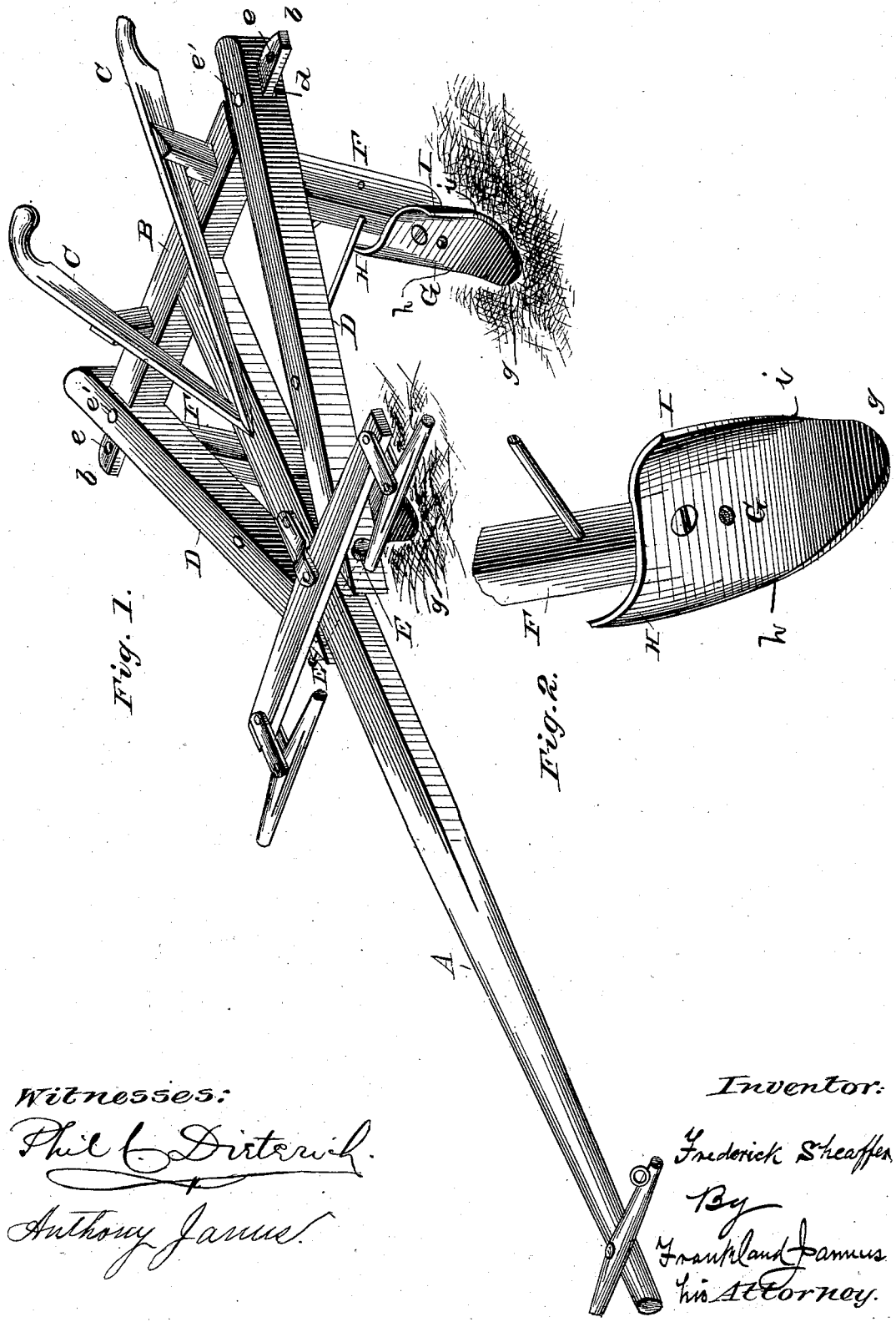

FREDERICK SHEAFFER, OF LIVERPOOL TOWNSHIP, PERRY COUNTY, PA.

STRADDLE-ROW CULTIVATOR.

SPECIFICATION forming part of Letters Patent No. 279,823, dated June 19, 1883.

Application filed April 6, 1883. (No model.)

*To all whom it may concern:*

Be it known that I, FREDERICK SHEAFFER, a citizen of the United States, residing in Liverpool township, in the county of Perry and State of Pennsylvania, have invented certain new and useful Improvements in Straddle-Row Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in the construction of cultivators of the type known as "straddle-row," and also to a blade or shovel of peculiar form to be used in connection therewith, as will be hereinafter fully explained.

In the drawings, Figure 1 is a perspective view, showing the general construction of my device. Fig. 2 is a detail view, showing the peculiar shape or conformation of my improved blade or shovel.

Similar letters denote like parts.

A represents the beam or stock, to which the draft is applied in any well-known manner, and to which, at its rear end, is permanently attached the cross-bar B. The handles C are mounted upon the said cross-bar, and are secured to the central beam, A, at their point of convergence.

D D are a pair of bars or pieces that are each provided with a slot or mortise, d, at their rear ends, and are suitably beveled and apertured in front. The cross-piece B is formed with a long tenon, b, extending from each of its ends, which tenons fit easily within the mortises d. The pieces D, when in position, are supported upon the tenons, which, being of suitable length and provided with a series of holes and corresponding pins, e e', admit the desired amount of lateral adjustment in the pieces D. The forward ends of the said pieces are beveled, as shown, and they are united to the stock A by a bolt, E.

To each of the pieces D is secured a standard, F, which standards carry the shovels G, that, as above described, are supported on the outer side of an adjustable triangular frame, between the several parts of which the crop can pass without injury. The shovels G are bent upward at their point $g$, and are in the form of a reverse curve at their upper portions, which extend outward or backward on the inside, as shown at H, and inward or forward on the outside, as shown at I, the said curved portion terminating at $h$ and $i$, respectively. By this construction it is rendered almost impossible for the soil to accumulate in front of the shovels, and each shovel will combine the functions of an ordinary shovel with those of a mold-board plow, the varied applications of which will be apparent.

It is obvious that the positions of the shovels may be exchanged and the actions of the shovels reversed, as it is desired to remove the soil from or throw it toward the crop.

I am aware that cultivators have heretofore been constructed with laterally-adjustable side pieces carrying the shovel-standards, and I therefore do not claim the same broadly, my invention consisting in the combination, with substantially such a frame, of shovels formed into a reverse curve at their upper portions and turned upward and forward at their points.

What I claim is—

In a cultivator, the combination, with the stock A, cross-bar B, and laterally-adjustable side pieces, D, provided with standards F, of the shovels G, formed with the reversely-curved upper portion, H $h$ I $i$, and upturned point $g$, substantially as shown and described.

In testimony whereof I affix my signature in presence of two witnesses.

FREDERICK SHEAFFER.

Witnesses:
W. W. HOLMAN,
J. S. ARNOLD.